US009116257B2

(12) United States Patent
Pritchard

(10) Patent No.: US 9,116,257 B2
(45) Date of Patent: Aug. 25, 2015

(54) METHOD AND APPARATUS FOR SEA CURRENT AIDED, ENHANCED AZIMUTH SEISMIC DATA ACQUISITION

(75) Inventor: Declan Pritchard, Oslo (NO)

(73) Assignee: FUGRO NORWAY AS, Oslo (NO)

( * ) Notice: Subject to any disclaimer, the term of this patent is extended or adjusted under 35 U.S.C. 154(b) by 678 days.

(21) Appl. No.: 13/465,653

(22) Filed: May 7, 2012

(65) Prior Publication Data
US 2013/0294194 A1 Nov. 7, 2013

(51) Int. Cl.
*G01V 1/38* (2006.01)
(52) U.S. Cl.
CPC .................. *G01V 1/3808* (2013.01)
(58) Field of Classification Search
CPC ..................................... G01V 1/3803
USPC .......................................... 367/15
See application file for complete search history.

(56) References Cited

U.S. PATENT DOCUMENTS

| 3,953,827 | A | 4/1976 | Le Moal et al. | |
|---|---|---|---|---|
| 2010/0118645 | A1* | 5/2010 | Welker | 367/17 |
| 2011/0286302 | A1* | 11/2011 | Welker et al. | 367/16 |

FOREIGN PATENT DOCUMENTS

| GB | 2452148 A | 2/2009 |
|---|---|---|
| WO | 2005/096018 A1 | 10/2005 |
| WO | 2009/005939 A1 | 1/2009 |

OTHER PUBLICATIONS

International Search Report mailed Sep. 20, 2013, in related International Application No. PCT/NO2013/050082.
Written Opinion of the International Searching Authority mailed Sep. 20, 2013, in related International Application No. PCT/NO2013/050082.

* cited by examiner

*Primary Examiner* — Mark Hellner
(74) *Attorney, Agent, or Firm* — Patent Portfolio Builders PLLC

(57) ABSTRACT

A system of designing and acquiring 3D marine seismic surveys such that the prevailing sea current is parallel or orthogonal to a major axis of the area to be surveyed. By steering the vessel and towed seismic source and receiver arrays through the water, heading into the sea current at some significant angle away from the sea current direction, then the resultant movement of the seismic source and receiver arrays will result in a much richer sampling and measurement of the earth's sub-surface by virtue of increasing the range of source-to-receiver azimuths available. By adopting this method, the final 3D seismic image of the subsurface will be more accurate and will be correctly focussed. Also line change times may be reduced significantly and the overall carbon footprint of the seismic survey may be lessened.

28 Claims, 10 Drawing Sheets

METHOD AND APPARATUS FOR SEA CURRENT AIDED, ENHANCED AZIMUTH SEISMIC DATA ACQUISITION

BACKGROUND

As marine seismic exploration is now increasingly deployed in deeper waters in the search for oil and gas, one of the major challenges is the existence of strong sea currents in many of the areas considered to have a high hydrocarbon potential. Deep waters such as those found in the Gulf of Mexico, South America, West, South and East Africa are already major targets for hydrocarbon exploration and will likely continue to be so over the coming years. The existence of these strong sea currents make conventional narrow azimuth surveys (NAZ) very difficult to carry out, and often drives up the cost.

One of the major elements of seismic exploration is the illumination of sub-sea geological structures with sound waves or pulses of known shape and form. Consistency of illumination is required so that reflection coefficients and other petrological characteristics can be determined from the reflected sound energy, and often in such a way as to be repeatable over many years (time-lapse seismic imaging for reservoir monitoring). Consequently there have been significant recent developments in the design and implementation of steerable seismic source and receiver arrays. These systems are designed to counter the effects of varying sea current strength to ensure consistent illumination with the desired narrow azimuth.

Another important factor that need consideration in areas beyond the continental margins and in deeper waters is that geological structures have dips that display a general tendency (but not always) to have the most significant rate of change in a direction perpendicular to the coastlines. Unfortunately, it is also generally true that strong sea currents tend to move parallel to coastlines. This is a problem because modern 3D seismic marine exploration, due to its limited azimuthal and sampling in perpendicular to the sail-line direction ("cross-line"), is generally deployed so as to sample data in the predominantly "dip" direction to ensure optimal imaging of the sub-surface. Hence the long felt need for steerable seismic source and hydrophone receiver arrays to counteract or mitigate the effects of cross-currents.

In many cases, seismic data are also acquired by steering the seismic acquisition system in a direction that substantially corresponds to the sea current direction. The drawbacks of this method are that large engine power is required to tow the seismic source and hydrophone receiver arrays when heading into the sea current. Conversely, when the acquisition system heading is with the sea current then the acquisition system speed through the water must be significantly lowered so ensure that the resultant speed along the sea floor is such that constant illumination is maintained. One of the drawbacks of this lower speed through the water is that the proper steering and control of the seismic source and receiver arrays becomes difficult to accomplish.

In narrow azimuth (NAZ) surveys typically every effort is made to fight sea currents and prevent the deviation of source and receiver azimuths from a very narrow range, as represented in FIGS. 1 & 3.

It is now widely accepted in the industry that the acquisition of multi azimuth, wide azimuth or rich azimuth seismic data (MAZ, WAZ & RAZ) provide greatly enhanced quality of the final subsurface images as compared to the results obtained in narrow azimuth (NAZ) surveys.

Seismic acquisition terminology will be explained in the following.

First, the term Common Mid-Point (CMP) is explained. Common mid points are points in the subsurface defined as the mid points between the various seismic source positions and the hydrophone (or geophone) receiver positions in terms of easting and northing, regardless of the depth of the source or receiver or the dip of the geological structures beneath.

Now, CMP bins is explained. A seismic survey area is typically sub-divided into CMP bins. CMP bins are usually defined as rectangular boxes (approaching square wherever possible) covering the whole area. The size of the CMP bins is dependent on the level of geological resolution required to image correctly all the dipping events, structures and geological faults expected in an area. Bin dimensions are typically in the range of 5 to 200 m and will determine the amount of effort required to image the sub-surface. All individual Common Mid-Points falling within the boundary of a CMP bin are labeled as belonging to that bin for further seismic data processing.

Now, Bin Fold is explained. Fold is defined as the number of common mid-points that accumulate within the boundaries of each CMP bin, and is indicative of the "effort" expended to create the final sub-surface image. The bin fold minimum value is one, 1. Other contributors to "effort" are the signal source strength, the number of receiver groups and the number of hydrophones (or geophones) within the receiver groups.

Now, Shot-Point Spacing (SP spacing) is explained. SP spacing is the distance, in the direction of source progression, between successive points where the seismic energy of the source is released into the water.

Now, Minimum Recording Interval is explained. The Minimum Recording Interval is the minimum time required to record seismic returns from deep within the earth and is usually measured from the time at which the source energy is released.

Now, Minimum Cycle Time is explained. The Minimum Cycle Time is the minimum time required by the energy source equipment to become fully energized and ready for the next release. Accordingly, the Minimum Cycle Time is equal to the shortest possible time interval between the consecutive shots which a seismic source of the seismic survey acquisition system is capable of generating.

In the following, explanations of the terms Maximum Line Spacing, Minimum Line Spacing, and Maximum Shot Point Spacing are provided The Maximum Line Spacing is the spacing of the sail-lines that are a) substantially perpendicular to the average prevailing sea current and b) determined so that the required bin fold is achieved. Consequently, when considering a vessel towing a seismic source and streamers having respective receiver groups across the direction of the sea current, the maximum line spacing is the line spacing that fulfils the condition fold=1 in all CMP bins. The maximum line spacing, Lmax is given by the equation:

$$Lmax = (Ymax/2) * \cosine \theta$$

according to which Lmax equals Ymax divided by two and multiplied by cosine θ, where Ymax is the maximum distance between the source position and the farthest receiver group of the farthest streamer, and θ is the angle (measured clockwise) between the average prevailing sea current direction and the direction of the farthest streamer.

The Minimum Line Spacing is the line spacing that gives largest value of the fold in the CMP bins without permitting the acquisition system to track over the same sail-line twice, and is therefore equal to the dimension of the CMP bin in a direction parallel to the average prevailing sea current direction.

The Maximum Shot Point Spacing, SPmax, is the distance interval that permits all CMP bins covered by a particular sail line to have fold and is given by:

$$SPmax = (N/2)*CMPx$$

according to which SPmax equals N divided by two and multiplied by CMPx, where N is the number of seismic receiver cables, and CMPx is the CMP bin dimension in a direction substantially perpendicular to the prevailing sea current direction.

The Minimum Shot Point Spacing is the spacing that permits highest possible value of the fold in the CMP bins without permitting the acquisition system to track over the same point twice, and is therefore defined as being equal to the CMP bin dimension in a direction substantially perpendicular to the prevailing sea current direction.

It is expected that sea currents will maintain a constant speed and direction over a distance of a few kilometers or less, but it is also reasonable to expect that over larger distances, the sea current will not follow a straight line but tend to change direction or meander somewhat, although on a larger scale is considered with respect to its average flow direction and speed.

For the purposes of understanding the method of the invention, we define the points at which the survey design is no longer considered substantially perpendicular to the prevailing sea current to be when either of the following conditions are met:

1. With reference to FIG. 9, when the resultant acquisition system movement vector (M), produced by the sea current vector (C) and the acquisition system heading speed vector (V), is too fast and the maximum SP interval is passed either before the Minimum Cycle Time has been achieved or the Minimum Recording Time for the deeper seismic reflections has not been achieved.

2. With reference to FIG. 10, when the acquisition system speed vector (V) is at a maximum and the acquisition system movement vector (M) is too small, and cannot achieve the minimum SP interval within a time period that is equal to 3 times the Minimum Recording Interval.

SUMMARY OF THE INVENTION

The present invention provides a method of performing a marine seismic survey in a survey area where sea water due to sea current is moving in a prevailing first direction relative to an underlying seabed, using an acquisition system comprising a vessel towing a seismic energy source adapted to emit acoustic energy towards the underlying seabed and a streamer carrying a plurality of receivers adapted to receive part of the acoustic energy returned from underlying structures of the seabed for collecting seismic data, the method comprising navigating the acquisition system with a longitudinal axis thereof in a direction substantially different from the prevailing direction of the sea current, and with a velocity relative to the sea water having
a) a first velocity component directed oppositely of and being of substantially equal magnitude to the sea current velocity, and
b) a second velocity component that is directed generally perpendicular to the prevailing first direction,
so as to move the acquisition system across the survey area along spaced apart sail-lines in alternating, respectively opposite first and second directions and being generally perpendicular to the prevailing first direction, and
operating the seismic energy source and receivers and collecting seismic survey data while located within the survey area.

The features of advantageous embodiments of the method of the invention are recited in the accompanying patent claims 2-18.

The present invention provides an apparatus for performing a marine seismic survey in a survey area where sea water due to sea current is moving in a prevailing first direction relative to an underlying seabed, the apparatus exhibiting the features recited in the accompanying patent claim 19.

The present invention provides a computer implemented method including using a computer apparatus for performing a marine seismic survey in a survey area where sea water due to sea current is moving in a prevailing first direction relative to an underlying seabed, the computer implemented method exhibiting the features recited in the accompanying patent claim 20.

The present invention provides a computer program product storing executable code for the computer implemented method recited in the accompanying patent claim 20.

To overcome the difficulties posed by strong sea currents and the limited azimuth sampling of towed 3D seismic streamers, the present invention involves deployment of conventional 3D seismic streamers to take advantage of sea currents to ensure consistent sub-surface illumination, increased azimuthal sampling and achieve improved imaging of the sub-surface geology. This is done by designing 3D seismic surveys such that a the seismic survey area is aligned with the prevailing sea current direction, and the heading orientation of the general longitudinal axis seismic streamer preferably being optimally angled at about either 135 or 225 degrees relative to the direction from which the sea current originates.

DETAILED DESCRIPTION OF THE INVENTION

By way of example, the invention will now he described, using reference to the accompanying drawings, in all cases and for the sake of simplicity of demonstration, the direction of the sea current is held at 180° compass heading.

FIG. 1 is a top view schematic drawing relating to a conventional marine 3D seismic data acquisition program, illustrating the typical survey designed without regard for prevailing sea current direction, where the survey layout has been designed with little or no consideration for the prevailing sea current direction.

FIG. 2 a top view schematic drawing relating to an example of a marine 3D seismic acquisition employing the present invention, in which example the 3D survey area is designed to align with the prevailing sea current direction, and acquisition system headings at approximately 45° each side of survey axis and prevailing sea current direction.

FIG. 3 is a graph illustrating the source to receiver azimuth distribution varying with distance down the seismic streamers away from the source position(s) for a conventionally towed 3D seismic acquisition system as depicted in FIG. 1, here represented by a graph of azimuth range vs. hydrophone offset along the seismic streamer for a 14 streamer array, with 100 m separation and 5000 m overall length. This is commonly referred to as narrow azimuth acquisition (NAZ). For ease of demonstration, this is depicted under weak or no sea current conditions. Sea currents would bend the shaded area upward or downward towards the far offsets.

FIG. 4 is a graph of the source to receiver azimuth distribution varying with distance down the seismic streamers away from the source position(s) for the two acquisition system headings depicted in FIG. 2, represented by a graph of azimuth range vs. hydrophone offset along the seismic streamer for a 14 streamer array, with 100 m separation and 5000 m overall length. The two acquisition system headings are approximately 45° each side of the prevailing sea current direction. This is effectively a multi azimuth (MAZ) system. The graph assumes that the streamer orientations can be maintained at or near 135° or 225° during all sea current speeds headed in the 180° direction.

FIG. 5 is a graph of the source to receiver azimuth distribution varying with distance down the seismic streamers away from the source position(s) for the two acquisition system headings depicted in FIG. 2 but also with the assistance of streamer steering to create a "fan" effect.

FIG. 6 is a graph of the source to receiver azimuth distribution varying with distance down the seismic streamers away from the source position(s) for the two acquisition system headings depicted in FIG. 2, with the assistance of streamer steering to create a "fan" effect, represented by a graph of azimuth range vs. hydrophone offset along the seismic streamer for a 14 streamer array, with 100 m separation and 5000 m overall length, and also at least one additional source vessel to achieve a rich azimuth dataset (RAZ). The two acquisition system headings are approximately 45° each side of the prevailing sea current direction.

DETAILED DESCRIPTION

Figure 1:
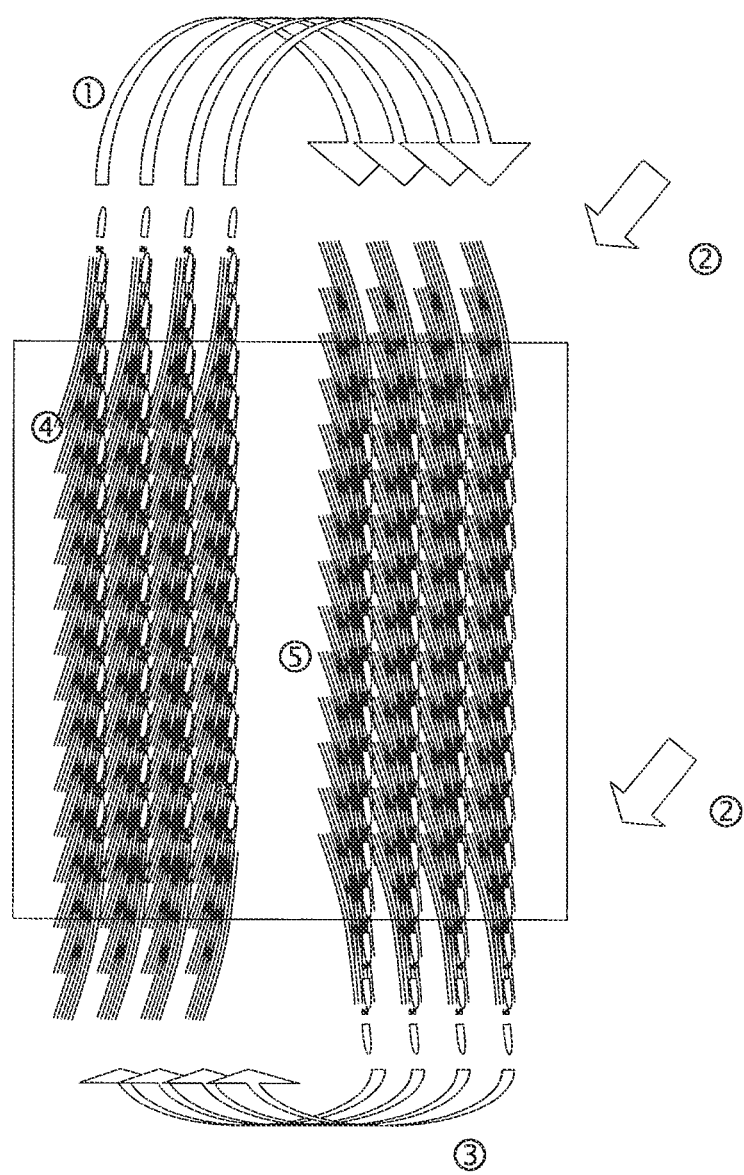

Referring to FIG. 1, the sail-line change time is represented by the arrows depicted at 1 and 3. The prevailing sea current direction is represented at 2. Line changes at position 1 take considerably longer than at position 3 because the prevailing sea current is acting against the realignment of the seismic streamers (4), whereas at position 3, the sea current assists the required realignment. Typically, due to the inequality of the azimuth/offset relationship of data gathered in the two different directions, there will likely be a need for additional "infill" passes of the acquisition system at 5.

Figure 2:
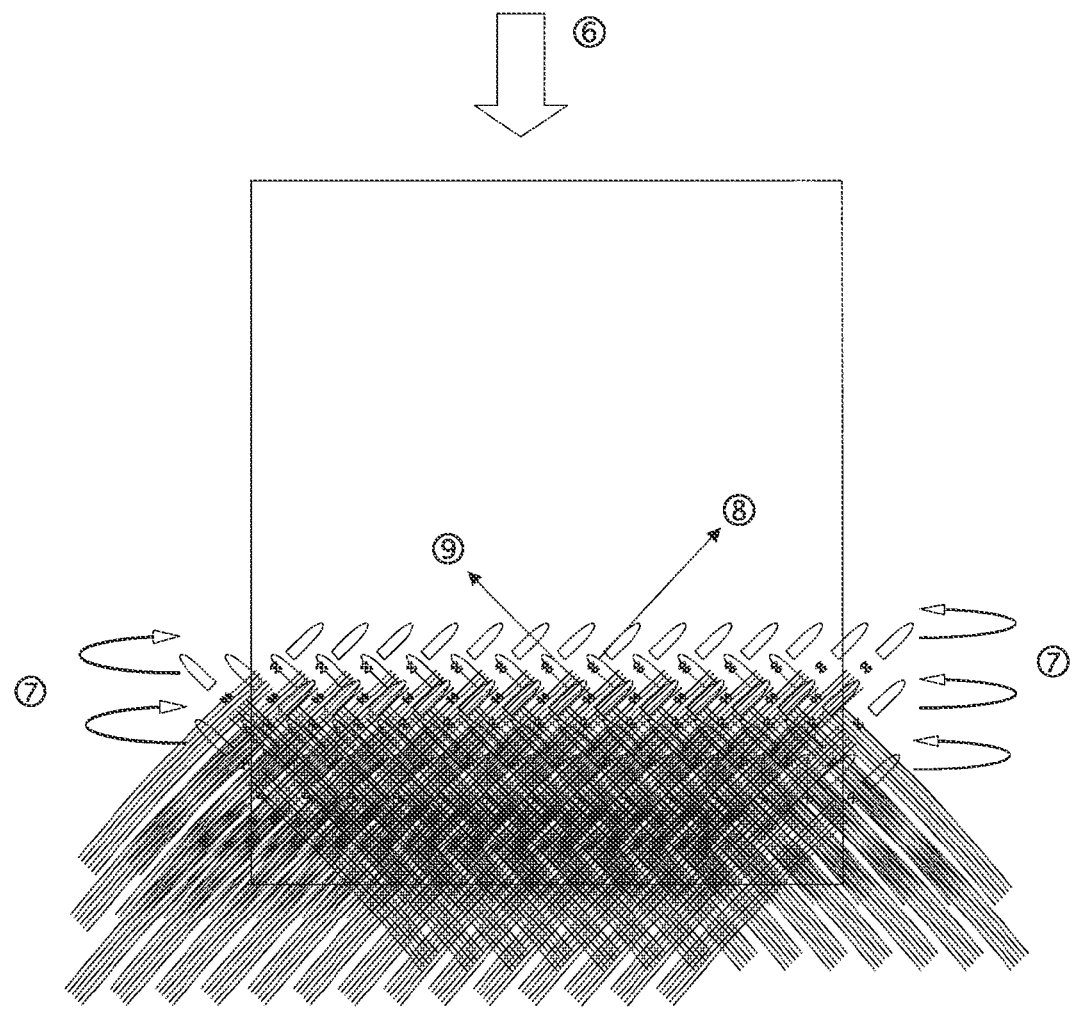

Referring to FIG. 2, the survey is designed such that it is parallel and/or orthogonal to the prevailing sea current direction at 6 (180°). At line change positions 7, the time for line change is considerably shortened as the sea current will assist the realignment of the seismic streamers in preparation for the next traverse of the acquisition system. Acquisition system headings and speed through the water, represented by the vectors at 8 and 9, directions of which are typically also representative of a general longitudinal axis of the seismic acquisition system, are chosen such that in combination with the sea current vector, the resultant acquisition system movement is in a direction generally perpendicular to the sea current direction. Accordingly, the towed seismic streamers will also traverse the survey area with a similar perpendicular motion.

Figure 3:
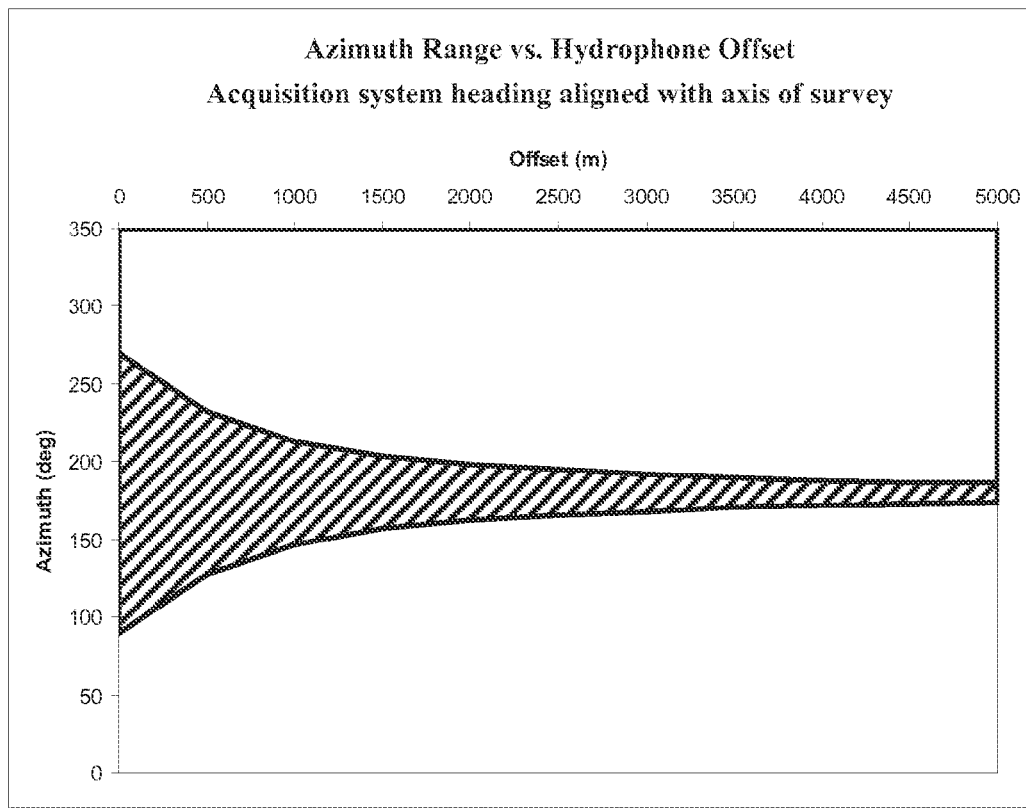

Referring to FIG. 3, the graph shows the variation of source to receiver azimuth plotted against distance along conventional (NAZ) seismic streamers. The model used to create the graphs was with 2 "flip-flop" source arrays, with a 14 streamer receiver array, with 100 m separation and 5000 m overall length. The major axis of the acquisition direction is 180°, but for clarity, is shown without any influence of sea current. It can be seen that at a distance of 1500 m the azimuth range is only about 50 degrees.

Figure 4:
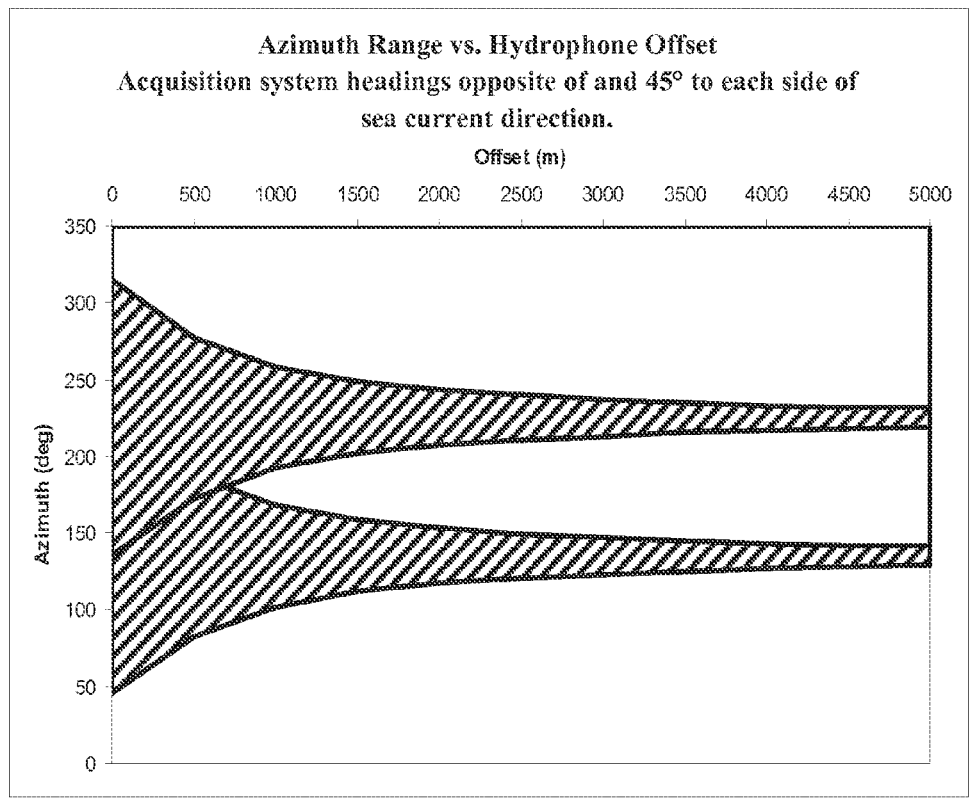

Referring to FIG. 4, the graph shows the variation of source to receiver azimuth plotted against distance along the seismic streamers using the data acquisition method proposed by the present invention. The 180° compass heading corresponds to a direction parallel to the prevailing sea current direction, and the surveys are made with the compass headings of the general longitudinal axis of the system at angles 135 and 225 degrees, It can be seen that the azimuth range at a distance of 1500 m totals about 100 degrees.

Figure 5:
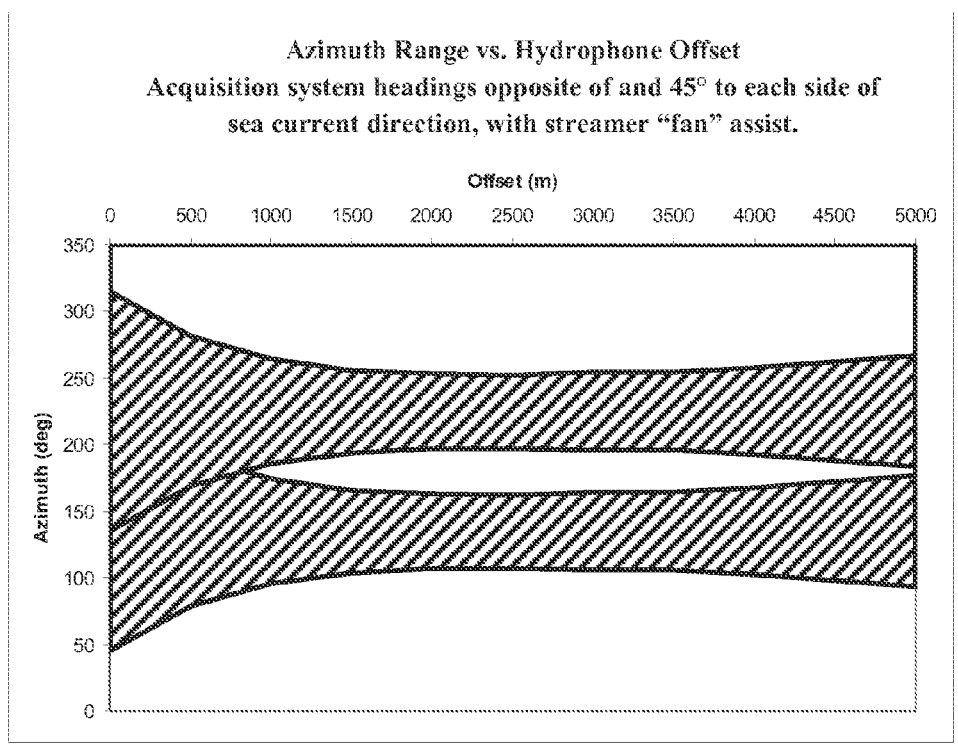

Referring to FIG. 5, the graph is as for FIG. 4, but the streamers have been deployed with active steering to increase streamer separation with distance away from the source. In this case the azimuth range at a distance of 1500 m is about 130 degrees and at 5000 m distance it is about 280 degrees.

Figure 6:
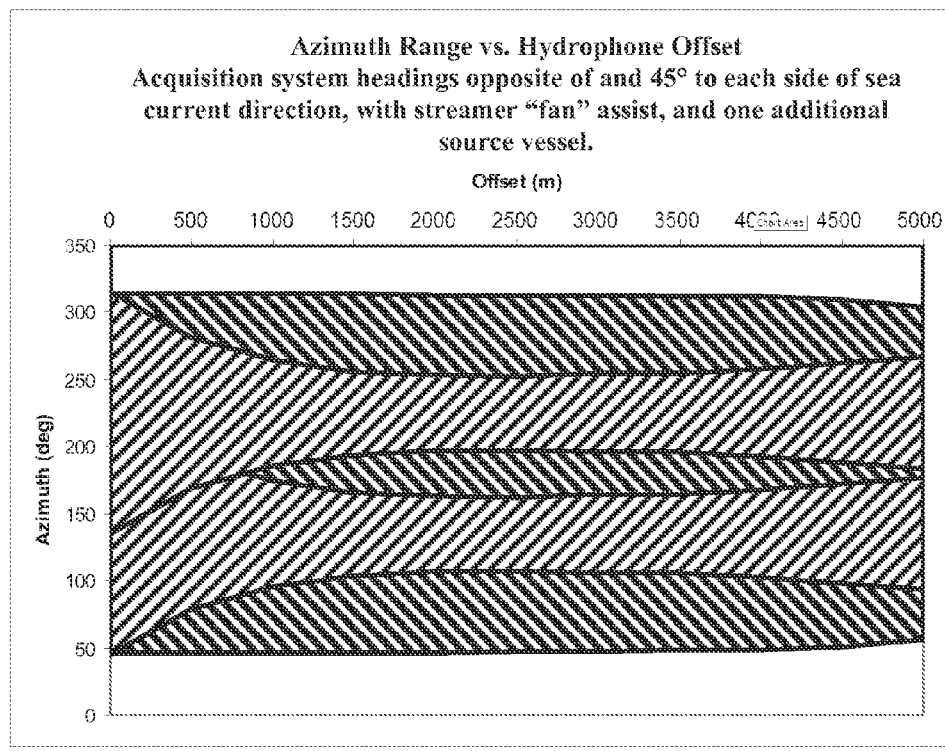
Figure 7:
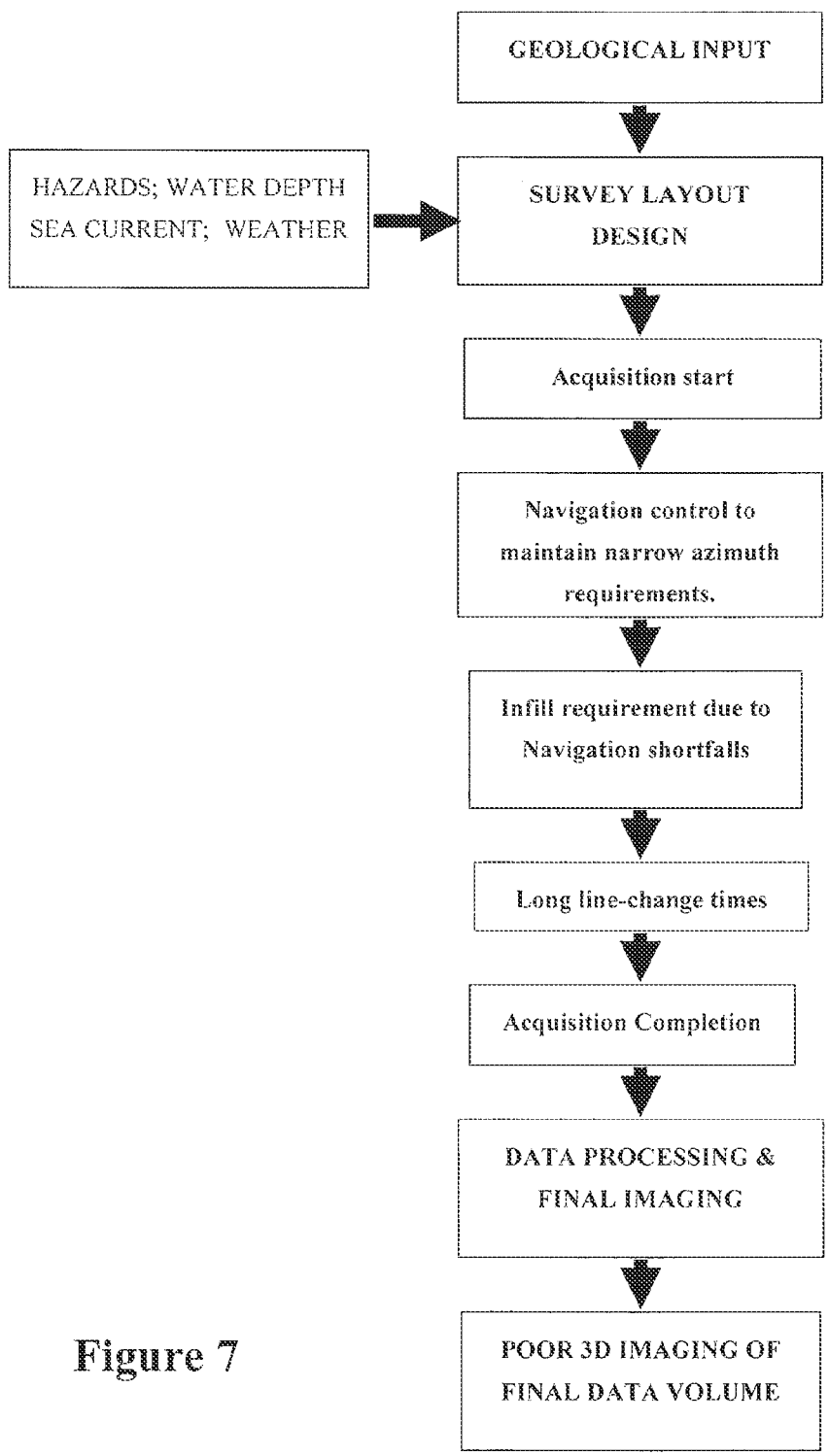
FIG. 7 is a block diagram showing the life cycle of a conventional narrow azimuth (NAZ) seismic survey.
Figure 8:
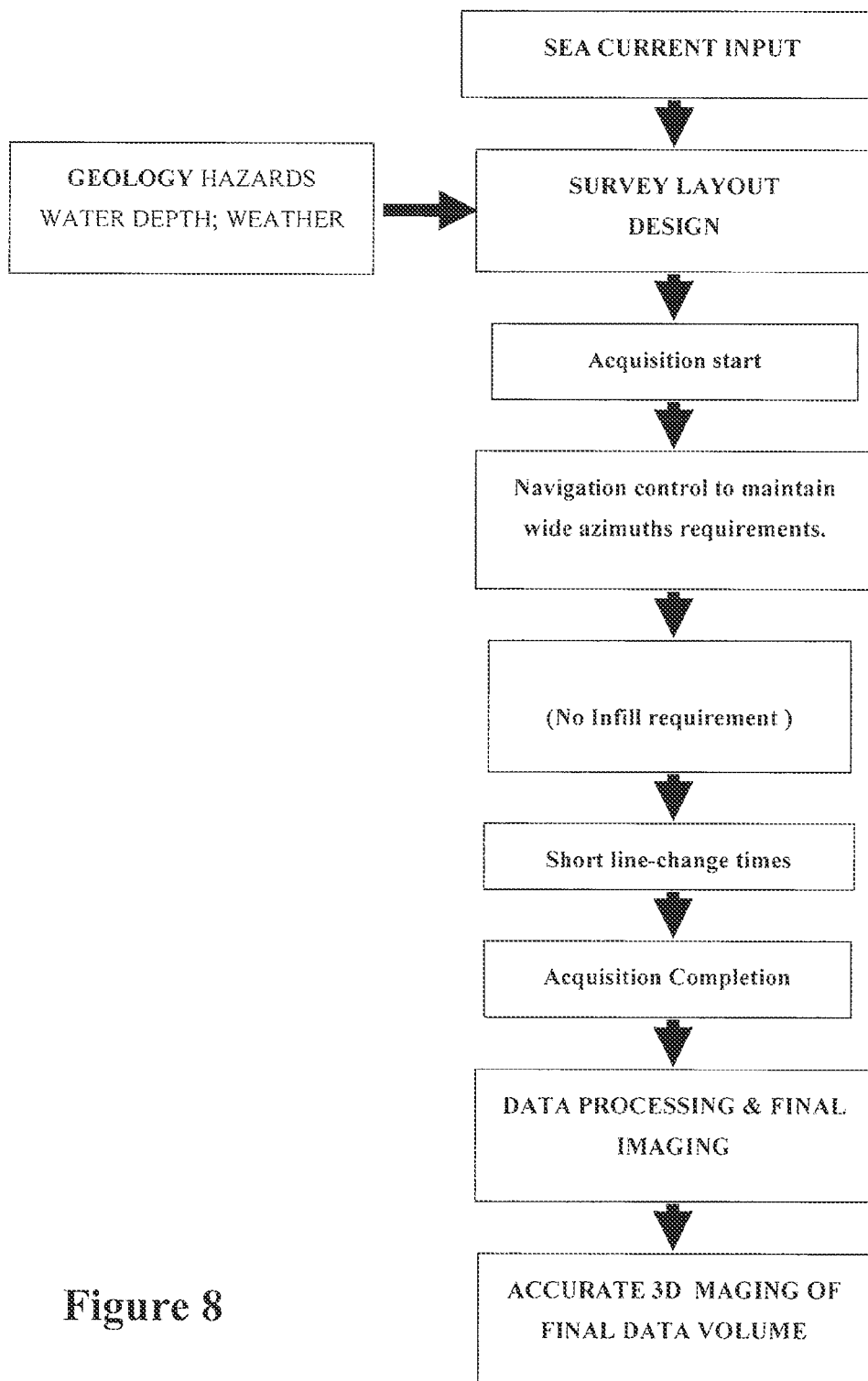
FIG. 8 is a block diagram showing the life cycle of the proposed method, which enables MAZ, WAZ and RAZ seismic surveys.

Referring to FIG. 6, the graph is as for FIG. 4, but with the deployment of a second source vessel. In particularly strong sea currents, this could assist in maintaining desired azimuth sampling, should control at the far offsets be difficult.

Figure 9:
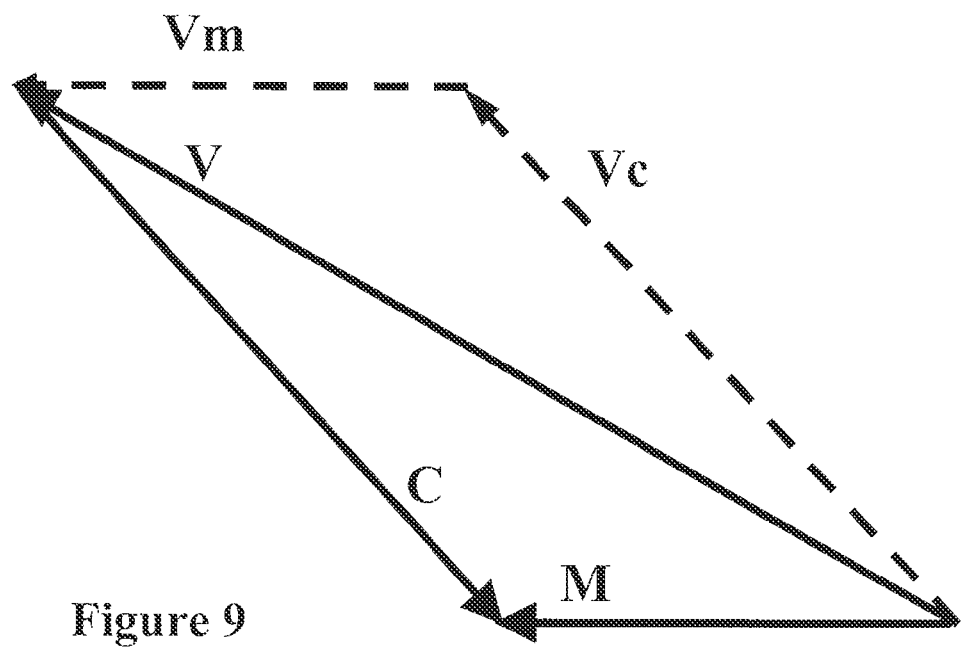
FIG. 9 is a schematic vector diagram illustrating the resultant acquisition system movement vector (M) produced by the sea current vector (C) and the acquisition system heading and speed vector (V), being too fast and the maximum SP interval is passed either before the Minimum Cycle Time has been achieved or the Minimum Recording Time for the deeper seismic reflections has not been achieved.
Figure 10:
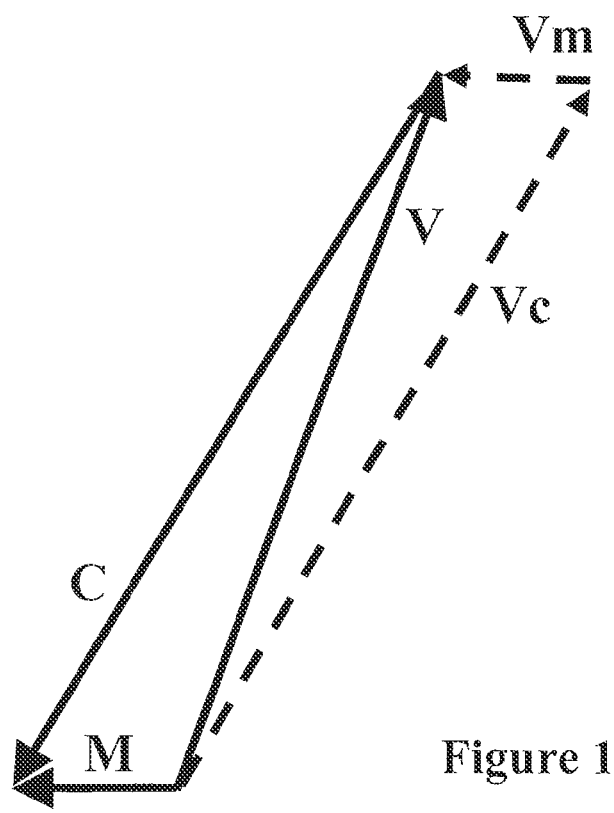
FIG. 10 is a schematic vector diagram illustrating the acquisition system speed vector (V) being at a maximum and the acquisition system movement. vector (M) being too small, and the minimum SP interval cannot be achieved within the time equivalent to 3 Minimum Recording Intervals.
Figure 11:
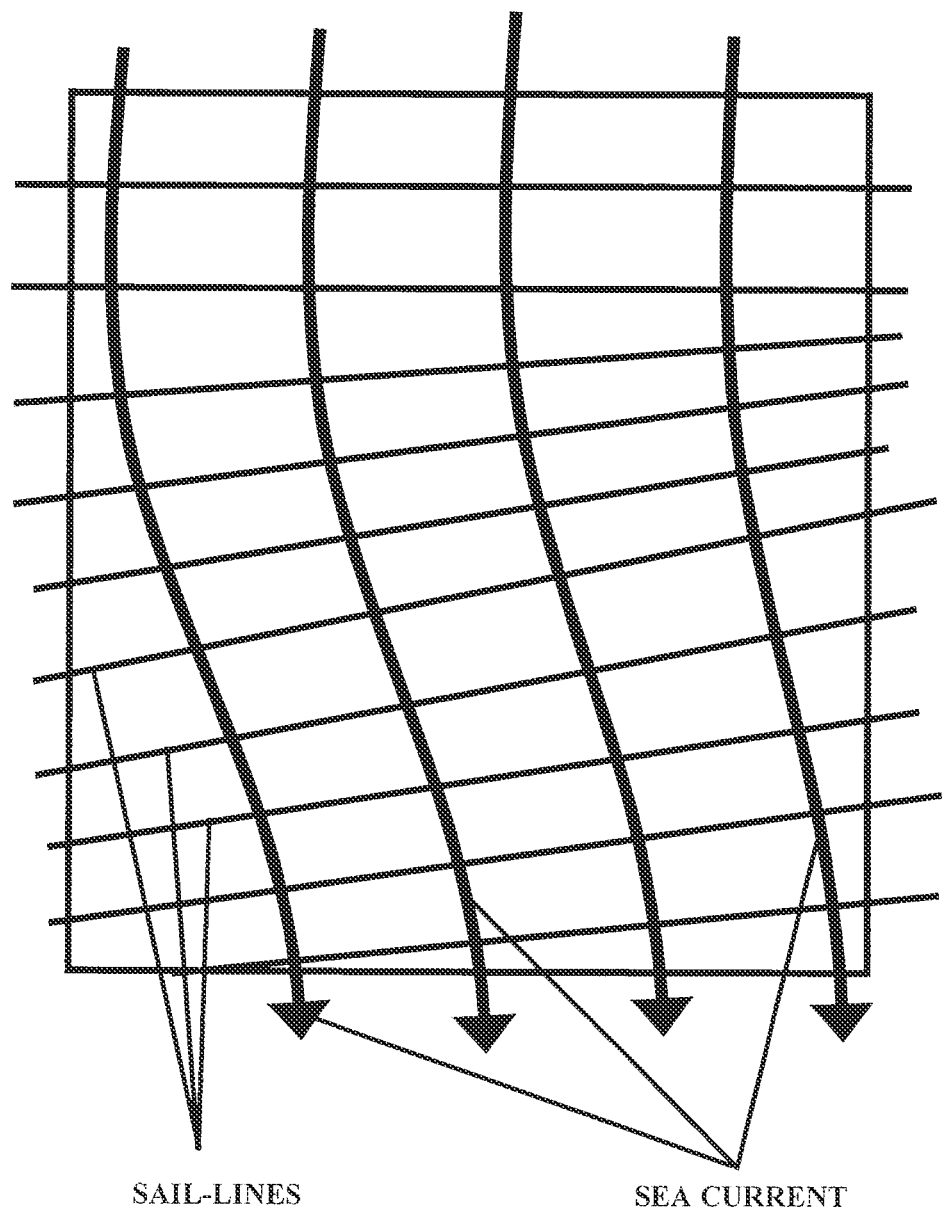
FIG. 11 is a schematic top view drawing illustrating the typical case with the direction of prevailing sea current, drawn in arrowy lines, varying slightly over an area to be surveyed. Cross-current solid lines drawn perpendicular to the prevailing sea current average direction illustrate the acquisition system sail-lines being substantially perpendicular to the prevailing sea current direction.

FIGS. 9 and 10 are drawn with intentionally exaggerating the angles of the direction of the movement vector of the acquisition system with respect to the direction of the sea current, however, indicating also that the direction of the speed vector of the acquisition system is considered generally perpendicular to the direction of the sea current also when deviating from 90 degrees angle, hut limited by other factors as disclosed elsewhere in the present disclosure and in accompanying patent claims.

Advantages

In addition to increasing the range of source-receiver azimuths contributing to each subsurface image "bin", the proposed system also has advantages impacting on other areas of the overall data acquisition system;

Time taken to implement sail-line changes could be shortened by 50% or more. This is because the cable orientations will only need to move by some 90°, which has been illustrated in FIG. 2, as opposed to 180° with conventional "race-track" type acquisition, which has been illustrated in FIG. 1. Cable re-orientation by the present invention will he assisted by the ambient sea current flow, rather than be opposed by it. This will be especially true for smaller surveys, where conventional "race-track" sail-line change time can often exceed the actual data gathering time.

When requiring extra line change time to service and maintain source or receiver arrays, there will be no need to make large circular detours. The acquisition system heading will always be into the prevailing sea current, therefore a relatively geo-stationary position can be tolerated. When the service or repair is complete, then the acquisition system can resume the data acquisition program more quickly.

Furthermore, when seismic data acquisition sequences or "runs" are interrupted by technical problems or failures, there will be no need to make the "circle around" maneuvers that are typically required when relying on previously known marine seismic survey schemes, as the vessel can maintain a relatively stationary position while repairs are carried out so that it will be very near the correct position to resume when repairs are completed.

There will also be an advantage gained from a reduced acquisition "foot-print" obtained by the employment of the present invention. This occurs because shallow seismic reflection data tend to be somewhat spatially undersampled. Images produced by these undersampled data tend to exaggerate differences in acquisition. Examples are the boundaries between swaths of acquisition acquired in two different directions, or the boundaries between two swaths that have been acquired under differing tidal or sea current conditions. This also generally requires some "infill" acquisition. Employment of the present invention will result in a decrease of these differences as acquisition direction will tend to be the same, and rates of change of tide or sea current will be relatively slower. Infill will thereby he reduced, as there are no swath boundaries when the sea current direction is relatively constant.

A further major advantage gained by employment of the present invention is an improved final migrated image, obtainable by the existence of a wide and varied azimuth range in the data. The efficacy of the final imaging of seismic data depends very strongly on the orientation of the source to receiver raypaths relative to the underlying topography (dips) of the rocks being imaged. For example, a source-receiver orientation perpendicular to dip direction may not reveal the dip at all, even with changing offsets. However, even if the dip is seen, the data will he poorly "migrated" to its correct image position as there is poor offset sampling in the direction perpendicular to the sail-line (up-dip) direction. Wide azimuth sampling will generally improve the final migrated image of rocks that have dips varying with depth, longitude and latitude.

Since there is no "race-track" style acquisition associated with the employment of the present invention, another advantage gained is increased efficiency of data processing. Data processing techniques, especially "migration" algorithms, require that data is acquired contiguously without breaks. This way data can be processed in a sequential cascaded fashion. With the "race-track" acquisition of the previously known marine seismic survey schemes, data is acquired in blocks and often data is required to be "migrated" more than once to create a seamless image. With the present invention, the data acquisition direction is the same as that required by the processing system, which will therefore be more efficient and more able to keep up with data acquisition speed.

Also, due to the improved efficiency of sail-line change and therefore overall reduction in acquisition time under "steam", with the employment of the present invention a significant fuel saving is made possible, which should greatly reduce the "carbon footprint" of the seismic data acquisition system.

The invention claimed is:

1. A method comprising:
   performing a marine seismic survey in a survey area where sea water due to sea current is moving in a prevailing first direction relative to an underlying seabed, using an acquisition system comprising a vessel towing a seismic energy source adapted to emit acoustic energy towards the underlying seabed and a streamer carrying a plurality of receivers adapted to receive part of the acoustic energy returned from underlying structures of the seabed for collecting seismic data, the method further comprising,
   navigating the acquisition system with a longitudinal axis thereof in a direction substantially different from the prevailing direction of the sea current, and with a velocity relative to the sea water having
   a) a first velocity component directed oppositely of and being of substantially equal magnitude to the sea current velocity, and
   b) a second velocity component that is directed generally perpendicular to the prevailing first direction,
   so as to move the acquisition system across the survey area along spaced apart sail-lines in alternating, respectively opposite first and second directions and being generally perpendicular to the prevailing first direction, and
   operating the seismic energy source and receivers and collecting seismic survey data while located within the survey area.

2. The method of claim 1, comprising navigating the acquisition system with the direction of the longitudinal axis of the acquisition system directed alternating to respective opposite sides of the prevailing direction of the sea current in correspondence with the alternating directions of the sail-lines.

3. The method of claim 1, comprising operating steering device in at least one of the vessel and the streamer, to maintain the streamer aligned on a the longitudinal axis in correspondingly alternating first and second directions rotated at respective first and second angles with respect to, and to respective, opposite sides of, the prevailing direction.

4. The method of claim 1, wherein the second velocity component is directed generally perpendicular to the prevailing first direction until a movement vector (M) of the acquisition system referenced to the sea bed reaches a point at which a maximum shot point interval is passed either before a minimum cycle time has been achieved or a minimum recording time for deeper seismic reflections has not been achieved.

5. The method of claim 1, wherein the second velocity component is directed generally perpendicular to the prevailing first direction until a speed vector (V) of the acquisition system referenced to the sea bed reaches a maximum and a movement vector (M) of the acquisition system referenced to the sea bed becomes too small to achieve a minimum shot point interval within a time period that is equal to 3 times a minimum recording interval.

6. The method of claim 1, wherein the direction of the longitudinal axis of the acquisition system is at an angle in a range from 35 to 55 degrees with respect to the prevailing direction of the sea current.

7. The method of claim 6, wherein the direction of the longitudinal axis of the acquisition system is at an angle of substantially 45 degrees with respect to the prevailing direction of the sea current the angles are.

8. The method of claim 2, wherein the direction of the longitudinal axis of the acquisition system when directed alternating to opposite sides of the prevailing direction of the sea current is at respective substantially equal angles with respect to the prevailing direction of the sea current.

9. A method comprising:
   designing 3D marine seismic surveys, wherein a major axis of a survey area is aligned with a prevailing sea current direction, and generating sail-lines to be followed by an acquisition system with a longitudinal axis thereof in a direction substantially different from the prevailing sea current direction, and with a velocity relative to the sea water having a first velocity component directed oppositely of and being of substantially equal magnitude to the sea current velocity, and a second velocity component that is directed generally perpendicular to the prevailing sea current direction, so as to move the acquisition system across the survey area along spaced apart sail-lines lines in alternating, respectively opposite first and second directions and being generally perpendicular to the prevailing sea current direction.

10. A method comprising:

performing a marine seismic survey in a survey area where sea water due to sea current is moving in a prevailing first direction relative to an underlying seabed;

navigating the acquisition system with a longitudinal axis thereof in a direction substantially different from the prevailing first direction of the sea current, and with a velocity relative to the sea water having a first velocity component directed oppositely of and being of substantially equal magnitude to the sea current velocity, and a second velocity component that is directed generally perpendicular to the prevailing first direction, so as to move the acquisition system across the survey area along spaced apart sail-lines in alternating, respectively opposite first and second directions and being generally perpendicular to the prevailing first direction; and collecting seismic survey data while increasing an effective azimuth range of a series of seismic source-receiver pairs, wherein the acquisition system includes the series of seismic source-receiver pairs.

11. A method comprising:

performing a marine seismic survey in a survey area where sea water due to sea current is moving in a prevailing first direction relative to an underlying seabed;

using an acquisition system comprising a vessel towing a seismic energy source adapted to emit acoustic energy towards the underlying seabed and a streamer carrying a plurality of receivers adapted to receive part of the acoustic energy returned from underlying structures of the seabed for collecting seismic data, wherein optimum speed and heading of the acquisition system is calculated such that the acquisition system navigates with a longitudinal axis thereof in a direction substantially different from the prevailing first direction of the sea current, and with a velocity relative to the sea water having a first velocity component directed oppositely of and being of substantially equal magnitude to the sea current velocity, and a second velocity component that is directed generally perpendicular to the prevailing first direction, wherein the acquisition system moves along spaced apart sail-lines being generally perpendicular to the prevailing first direction.

12. The method of claim 1, including varying the acquisition system heading and speed relative to the prevailing sea current such that the total azimuth range can be altered so as to close or open the gap between azimuth ranges.

13. The method of claim 1, including employing one or more additional source vessels, optionally with their own towed streamers, such that the azimuth range is increased.

14. The method of claim 1, including employing an acoustic positioning array distributed between the additional source vessels and the principal seismic receiver array such that the additional source vessels act as acoustic reference point(s) linked to their own satellite global positioning system(s).

15. The method of claim 13, including employing acoustic arrays and/or inertial navigation systems on the principal receiver array and between the additional source vessels and the principal seismic receiver array, such that use of streamer tail-buoys can be reduced or avoided.

16. The method of claim 1, including calculating the distribution of all source to receiver distances within common mid-point imaging bins, such that distribution deficiencies can be calculated so as to determine the correct future positions of the principal vessel and/or additional source vessels on subsequent passes through the survey area.

17. The method of claim 1, including calculating the distribution of all source to receiver azimuths within common mid-point imaging bins, such that distribution deficiencies can be calculated so as to determine the correct future positions of the principal vessel and/or additional source vessels on subsequent passes through the survey area.

18. The method of claim 1, including employing one or more paravane devices attached to a tail-buoy of one or more of the seismic streamers, such that optimum separation and azimuth angles are maintained.

19. A system comprising:

an apparatus for performing a marine seismic survey in a survey area where sea water due to sea current is moving in a prevailing first direction relative to an underlying seabed, using an acquisition system comprising a vessel towing a seismic energy source adapted to emit acoustic energy towards the underlying seabed and a streamer carrying a plurality of receivers adapted to receive part of the acoustic energy returned from underlying structures of the seabed for collecting seismic data, the apparatus comprising a navigating device adapted to navigate the acquisition system with a longitudinal axis thereof in a direction substantially different from the prevailing direction of the sea current, and with a velocity relative to the sea water having a) a first velocity component directed oppositely of and being of substantially equal magnitude to the sea current velocity, and b) a second velocity component that is directed generally perpendicular to the prevailing first direction, so as to move the acquisition system across the survey area along spaced apart sail-lines in alternating, respectively opposite first and second directions and being generally perpendicular to the prevailing first direction, and an operating device adapted to operate the seismic energy source and receivers and collecting seismic survey data while located within the survey area.

20. A computer implemented method comprising:

using a computer apparatus for performing a marine seismic survey in a survey area where sea water due to sea current is moving in a prevailing first direction relative to an underlying seabed, using an acquisition system comprising a vessel towing a seismic energy source adapted to emit acoustic energy towards the underlying seabed and a streamer carrying a plurality of receivers adapted to receive part of the acoustic energy returned from underlying structures of the seabed for collecting seismic data, the method including operating a computer program in the computer apparatus for navigating the acquisition system with a longitudinal axis thereof in a direction substantially different from the prevailing direction of the sea current, and with a velocity relative to the sea water having a) a first velocity component directed oppositely of and being of substantially equal magnitude to the sea current velocity, and b) a second velocity component that is directed generally perpendicular to the prevailing first direction, so as to move the acquisition system across the survey area along spaced apart sail-lines alternating, respectively opposite first and second directions and being generally perpendicular to the prevailing first direction, and for operating the seismic energy source and receivers and collecting seismic survey data white located within the survey area.

21. A non-transitory computer program product storing executable code that, when executed by a computer apparatus, performs a method comprising:

using the computer apparatus for performing a marine seismic survey in a survey area where sea water due to sea current is moving in a prevailing first direction relative to an underlying seabed, using an acquisition system comprising a vessel towing a seismic energy source adapted to emit acoustic energy towards the underlying seabed and a streamer carrying a plurality of receivers adapted to receive part of the acoustic energy returned from underlying structures of the seabed for collecting seismic data, the method including operating a computer program in the computer apparatus for navigating the acquisition system with a longitudinal axis thereof in a direction substantially different from the prevailing direction of the sea current, and with a velocity relative to the sea water having a) a first velocity component directed oppositely of and being substantially equal magnitude to the sea current velocity, and b) a second velocity component that is directed generally perpendicular to the prevailing first direction, so as to move the acquisition system across the survey area along spaced apart sail-lines in alternating, respectively opposite first and second directions and being generally perpendicular to the prevailing first direction, and for operating the seismic energy source and receivers and collecting seismic survey data while located within the survey area.

22. The method of claim 11, including varying the acquisition system heading and speed relative to the prevailing sea current such that the total azimuth range can be altered so as to close or open the gap between azimuth ranges.

23. method of claim 11, including employing one or more additional source vessels, optionally with their own towed streamers, such that the azimuth range is increased.

24. The method of claim 11, including employing an acoustic positioning array distributed between the additional source vessels and the principal seismic receiver array such that the additional source vessels act as acoustic reference point(s) linked to their own satellite global positioning system(s).

25. method of claim 23, including employing acoustic arrays and/or inertial navigation systems on the principal receiver array and between the additional source vessels and the principal seismic receiver array, such that use of streamer tail-buoys can be reduced or avoided.

26. The method of claim 11, including calculating the distribution of all source to receiver distances within common mid-point imaging bins, such that distribution deficiencies can be calculated so as to determine the correct future positions of the principal vessel and/or additional source vessels on subsequent passes through the survey area.

27. The method of claim 11, including calculating the distribution of all source to receiver azimuths within common mid-point imaging bins, such that distribution deficiencies can be calculated so as to determine the correct future positions of the principal vessel and/or additional source vessels on subsequent passes through the survey area.

28. The method of claim 11, including employing one or more paravane devices attached to a tail-buoy of one or more of the seismic streamers, such that optimum separation and azimuth angles are maintained.

* * * * *